Figure 2A:

Feb. 9, 1960 H. E. LANDEEN 2,924,186
PLANTING DEVICE FOR SEED TAPE
Filed Nov. 1, 1956

INVENTOR.
HAROLD E. LANDEEN
BY
Carpenter, Abbott, Coulter + Kinney
ATTORNEYS

United States Patent Office 2,924,186
Patented Feb. 9, 1960

2,924,186

PLANTING DEVICE FOR SEED TAPE

Harold E. Landeen, Mahtomedi, Minn., assignor to Minnesota Mining and Manufacturing Company, St. Paul, Minn., a corporation of Delaware Application November 1, 1956, Serial No. 619,778

5 Claims. (Cl. 111—5)

This invention relates to seed planters in which a flexible strip of tape form carrier material containing seeds in spaced relation is placed in a ground furrow at the proper depth.

It is an object of the invention to provide a simple, inexpensive, and efficient structural means whereby the planting of such seed-bearing tape is effected in an easy, inexpensive, and rapid manner.

It is another object of the present invention to provide an implement for planting seed-bearing tape which is readily adaptable to application upon conventional seed planting devices so that by such conversion conventional seed planting equipment will become capable of planting seed-bearing tape.

It is a further object of the invention to provide an implement for planting seed-bearing tape, which is capable of metering from a supply of seed-bearing tape an adequate but not excessive supply of seed-bearing tape, as the implement is moved over and through the earth.

It is a further object of the invention to provide an implement for the planting of seed-bearing tape, which will prevent the sudden imposition of excess strains upon the seed-bearing tape by reducing the possibility of sudden slack take-up therein, and which will effect the planting of the seed-bearing tape without substantial stretching of or injury to the said tape.

It is a further object of the invention to provide an implement for the planting of seed-bearing tape, which implement has incorporated therein and as a part thereof, means for distributing fertilizer in the soil with, and preferably under, the seed tape.

It is a still further object of the invention to provide an implement for the planting of seed-bearing tape, which implement is equipped with means for covering and packing soil into and upon a furrow created by the said implement after the seed tape and/or fertilizer is/are planted.

A still further object of the invention is to provide a metering roll for a device for planting seed-bearing tape, which roll has, on its circumferential surface, a substance which will frictionally contact the seed-bearing tape, so as to pull the said tape over the surface of the metering roll.

Still further objects of the invention will be apparent as my disclosure progresses.

The seed-carrier tape of Nestor (U.S. Patent No. 2,648,165, August 11, 1953) is capable of being actually planted and compacted in the ground in order to accomplish the biological ends for which the tape was designed. Obviously the planted end of the tape is highly stabilized against being pulled in the direction of the planting device as the planting device moves away from the planted tape. If the tape is required to pull itself off the supply roll as the planting device moves over the earth, strains are exerted upon the tape, which tend to break, stretch, or damage the seed-bearing tape. I have incorporated into my device for planting seed-bearing tape, a tension roll for the purpose of preventing the accumulation of slack in the tape, and a metering roll coupled to the guide wheel so as to provide for the withdrawing or feeding from the supply roll of tape carried on my device, just enough of the seed-bearing tape so as to cover the lineal distance traveled by my planting device in its course over and through the ground. Thus, with the use of my device, it is possible to plant seed-bearing tape of even extremely low tensile strength, without imposing upon the tape at any point along its length the unusual, sudden or excessive strains which would be imposed upon the seed-bearing tape if the said tape were required to pull itself off the supply roll thereof, and at the same time avoiding the accumulation of slack between the supply roll and the tape-guide shoe. Therefore, as contrasted to other devices for planting seed-bearing tapes, any variation in the speed of my device as moved over the ground is automatically compensated in the amount of tape withdrawn from the supply thereof. In seed-tape planting devices lacking such provisions as I have made use of for preventing the accumulation of slack in the tape, slack would inevitably accumulate as a result of variations in the speed of the movement of the device over the earth, and could in the event of a spurt in the speed of the device as moved across the ground, result in such strains upon the tape that it would break or be stretched or damaged.

Quite obviously, lacking the safeguards I have incorporated in my invention, devices for planting seed-bearing tapes would be unsuccessful, even for distributing relatively strong tapes.

It is to be noted that in the preferred form of my invention, a finely ground abrasive paper covers the circumferential surface of the metering roll. In the alternative, this may either be an abrasive coating applied with an adhesive directly to the surface of the metering roll itself, an abrasive cloth or abrasive paper or an abrasive coated plastic substance, or the roll may be a wheel comprising abrasive substance. While other means of forming frictional contact between the metering roll and the tape might be employed, experiment has shown that providing a surface of a finely ground abrasive to the roll makes possible strong frictional contact between the roll and the tape, without injury to the tape. Other means of forming such frictional contact present the dangers of stretching, tearing, or perforating the tape. In devices employing adhesive substance on the circumference of a metering roll, the danger is present that the tape may become stuck to the said adhesive substance.

Figure 1:
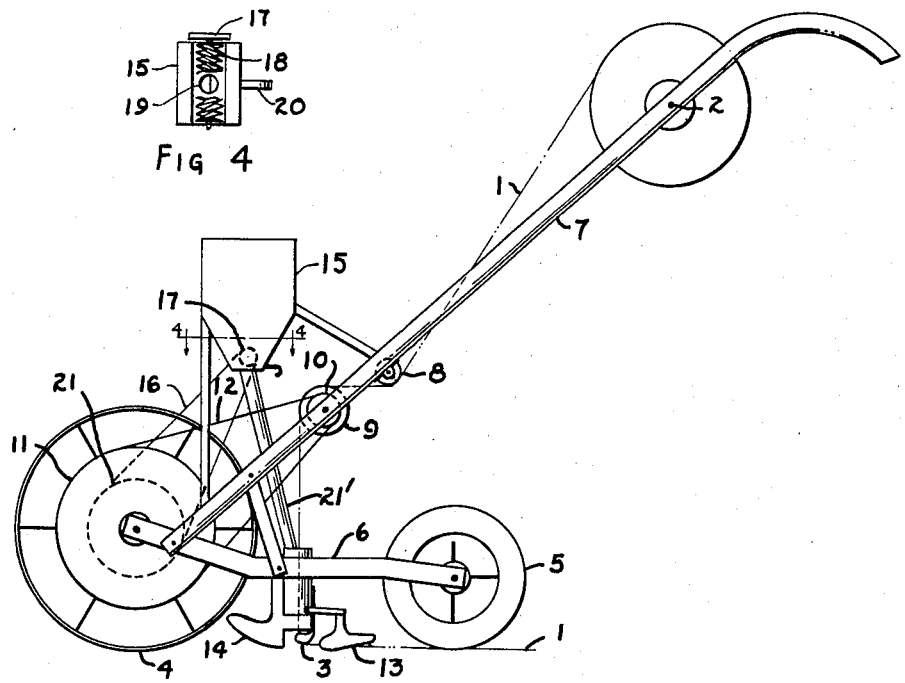

In the accompanying drawings Figure 1 is a side elevation of the invention as applied to adapt a conventional seed planting implement to the planting of seed-bearing tape.

Figure 2B:
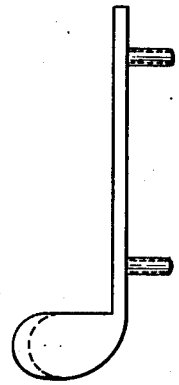
Figure 3A:
Figure 3B:
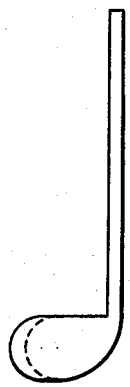
Figure 4:
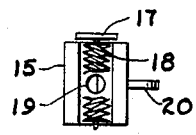

Figure 2A is a front view of the tape-guide shoe. Figure 2B is a side elevation of the shoe shown in front view in 2A. Figure 3A is a front elevation of a modification of the tape-guide shoe. Figure 3B is a side elevation of the tape-guide shoe shown in Figure 3A. Figures 2A, 2B, 3A, and 3B show only two of many possible modifications of the vertical shank of the tape-guide shoe for adaptation upon various types of conventional seed planters. Figure 4 is a cross-section view of an optional fertilizer dispenser which may be incorporated in the seed tape planting implement, looking downward through a horizontal section cut on the line 4—4 in Figure 1 and with part of the shaft shown broken away. In the accompanying drawings wherein like numerals designate like parts 1 is the seed-bearing tape, 2 is a rod for supporting a stock roll of seed-bearing tape, 3 is a tape-guide shoe, 4 is a guide wheel, 5 is a pack roll, 6 is a structural frame of the seed tape planter, 7 are handles, 8 is a tension roll, 9 is a metering roll, 10 and 11 are pulleys, 12 is a flexible belt interconnecting 10 and 11, 13 is a covering shoe, 14 is a furrow opener or share.

In the preferred form of my invention, as illustrated and set forth in the drawings and foregoing description, means 2 are provided for the carrying of a stock roll of seed-bearing tape upon the upper frame of the planting implement as indicated by Figure 1. This consists of a rod extending between and through the handles 7. Proper tension of the seed-bearing tape as it passes from the stock roll, so as to avoid excessive strain upon the tape and the accumulation of slack, is provided by a tension roll or wheel 8, lying below the stock roll 1. The seed-bearing tape is drawn over the surface of the metering roll 9, upon which surface is substance which frictionally contacts the tape, which substance is, in the preferred form of my invention, a finely ground abrasive. Normally it may not be necessary to further restrict the stock roll of tape from unwinding when the forward motion of the planter is slowed or stopped; however, it is contemplated that where desirable, a simple brake or drag may be employed for the purpose of assuming that no undesirable slack accumulate in the tape.

The metering wheel or roll 9 is equipped with the fixed pulley 10. The flexible belt 12 moves about the pulley 10 as well as about the pulley 11 which is fixed to and upon the guide wheel 4 and which pulleys are of proper dimensions so that there is drawn over the surface of 9 by the motion of the guide wheel 4, the amount of tape required to cover the lineal distance traveled by the planter. The seed-bearing tape then descends forward of the vertical shank and between the flanged sides of the tape-guide shoe 3 and into the furrow which has been created by the furrow opener or share 14. The covering shoe 13 then covers the tape with earth and the planter row is subsequently compacted under the weight and motion of the pack roll 5. It is within the contemplation of this invention that there may be added to the device, where desirable, a simple, additional component, as shown, for the disposition of fertilizer alongside, above, or below the tape prior to the planting of tape in the furrow. In the preferred form, such simple component is demountably attached to the frame and has its lower aperture located rearward of the furrow opener 14 and forward of the tape-guide shoe 3. As shown in Figure 4, 15 is the housing or fertilizer container component of a fertilizer distributing means, 16 is a flexible belt connecting a pulley 21 (shown in broken lines) fixedly and concentrically attached to the wheel 4 and the pulley 17 (shown in broken lines) which is fixedly and concentrically attached to a shaft extending laterally through the said housing 15, 18 are worms fixedly attached and driven by the said shaft upon which the pulley 17 is outwardly attached, said worms being located interior of said housing, 19 is an aperture located in the bottom of said housing through which the fertilizer is conducted out of the housing or fertilizer container and down into the chute 21′, and 20 is a flat strap located interior of the said housing and so constructed and arranged that it is possible, by moving the said strap backward and forward, to cover or uncover all or portions of the said aperture 19 in order to close or alter the size of the aperture 19 and thereby regulate the amount of fertilizer released from the housing or fertilizer container 15. It will be obvious that a paddle wheel type agitator or a vertical screw agitator may be substituted for the means I have used for agitating the fertilizer.

It is to be understood that the preferred form of my invention as shown and described is only exemplary of my invention, and is not intended as a limitation or restriction upon my invention as conceived or practiced.

I claim as my invention:

1. A device for the planting of seed-bearing tape in continuous unbroken length permitting easy feeding, rethreading and cleaning of the seed-bearing tape laying element comprising in combination a frame, and, fastened to the upper part of said frame in the order named, supporting means for a stock roll of seed-bearing tape, means for keeping said stock roll under tension, and a metering roll; means for driving the metering roll from a guide wheel as hereinbelow identified; and, fastened to the lower part of said frame in the order named, a guide wheel, means of creating a furrow, a tape-guide shoe for placing the seed-bearing tape within the furrow, a covering shoe for covering the furrow with earth, and a pack roll for compacting the earth covering the furrow; said guide shoe comprising a vertically held supporting strap having at the lower end a smooth forwardly facing, horizontally positioned, planoconvex tape-feeding surface and lateral tape-guiding flanges on each side thereof, and said strap being vertically adjustably rigidly attached to said frame.

2. A device for the planting of seed-bearing tape in continuous unbroken length comprising in combination a frame, and, attached thereto in the order named: supporting means for a stock roll of seed-bearing tape; a tension roll over which the seed tape is transported by means of a metering roll, a guide wheel, and means for driving the metering roll from the rotation of the guide wheel; and, attached to said frame rearwardly of said guide wheel in position for contacting the soil and in the order named, a share to open a furrow, a tape-guide shoe for placing the seed-bearing tape into the open furrow, a covering shoe for covering the furrow with earth, and a pack roll for compacting the earth covering the furrow; said guide shoe comprising a vertically held supporting strap having at the lower end a smooth forwardly facing, horizontally positioned, planoconvex tape-feeding surface and lateral tape-guiding flanges on each side thereof, and said strap being vertically adjustably rigidly attached to said frame.

3. A device for the planting of seed-bearing tape in continuous unbroken length comprising in combination: a movable, handled frame; supporting means attached in the upward portion of the handles for supporting a stock roll of seed-bearing tape; a tension roll over which the seed tape is transported by means of a metering roll covered with a frictional substance; a guide wheel supporting the lower end of the frame; pulleys rigidly attached to said guide wheel and metering roll and concentric therewith and operably connected to each other by a drive belt; a share to open a furrow, a tape-guide shoe for placing the seed-bearing tape into the furrow, a covering shoe for covering the furrow with earth, and a pack roll for compacting the furrow with earth attached to said frame rearwardly of said guide wheel in position for contacting the soil and in the order named; said guide shoe comprising a vertically held supporting strap having at the lower end smooth, forwardly facing, horizontally positioned, planoconvex tape-feeding surface and lateral tape-guiding flanges on each side thereof, and said strap being vertically adjustably rigidly attached to said frame.

4. A device for the planting of seed-bearing tape over long distances in continuous, unbroken length and permitting easy seeding, rethreading and cleaning of the seed-bearing tape-laying element, and for continuously, simultaneously applying with said tape metered amounts of powdered fertilizer, said device comprising, in combination: a frame; fastened to the upper part of said frame in the order named, supporting means for a stock roll of seed-bearing tape; means for keeping said stock roll under tension; a metering roll; a fertilizer distributor comprising a container and therein a metering agitator for emitting powdered fertilizer through an outlet having a regulating valve; means for driving said metering roll and said metering agitator from a guide wheel as hereinbelow identified; and, fastened to the lower part of said frame in the order named, a guide wheel, means of creating a furrow, a fertilizer-positioning terminal of the fertilizer distributor outlet for placing the fertilizer within said furrow, a tape-guide shoe for placing the seed-bearing tape within said furrow, a covering shoe for covering said tape and fertilizer within said furrow with earth, and a pack roll for compacting said earth; said guide-shoe comprising a vertically held supporting strap having at the lower end a smooth, forwardly facing, planoconvex, tape-feeding surface with projecting lateral flanges on each side thereof, and said strap being vertically, adjustably, rigidly attached to said frame.

5. A device for the planting of seed-bearing tape in continuous, unbroken length, and for continuously simultaneously applying powdered fertilizer in metered amounts adjacent to and below said tape, comprising in combination: a frame supported at its forward end by a guide wheel and fastened to the upper part of said frame in the order named: supporting means for a stock roll of seed-bearing tape; a tension roll over which the seed-tape is drawn by means of a metering roll; a fertilizer distributing attachment comprising a container and a screw-type agitator therein, an outlet from said container, and an adjustable valve to regulate the amount of fertilizer emitted from the said container; and means for driving the metering roll and the screw-type agitator from said guide wheel; and, supported from said frame and in position along the line of planting, rearwardly of said guide wheel and in the order named: a share to open a furrow; a fertilizer-positioning terminal of the fertilizer distributor outlet for placing the fertilizer within said furrow; a tape guide-shoe, capable of resisting shock and impact, for protectively guiding the continuous strip of seed bearing tape into the open furrow, comprising a vertically suspended supporting strap portion having an upper portion equipped with means for vertical adjustment thereof and a lower tape-feeding foot portion having a smooth, forwardly facing, horizontally positioned, plano-convex, wear-resistant surface for supporting and directing said tape, and a forwardly extending flange-like tape guiding member at each side thereof; a covering shoe for covering said tape and fertilizer within said furrow with earth; and a pack roll for compacting said earth.

References Cited in the file of this patent

UNITED STATES PATENTS

| | | |
|---|---|---|
| 603,802 | Whitaker | May 10, 1898 |
| 701,569 | Israel | June 3, 1902 |
| 1,095,383 | Cole | May 5, 1914 |
| 1,292,082 | Sanford | Jan. 21, 1919 |
| 1,562,353 | McGuire et al. | Nov. 17, 1925 |
| 1,750,054 | Rosso | Mar. 11, 1930 |
| 2,689,098 | Shacklett et al. | Sept. 14, 1954 |

FOREIGN PATENTS

| | | |
|---|---|---|
| 516,522 | France | Dec. 8, 1920 |
| 1,098,668 | France | Mar. 9, 1955 |